Patented Oct. 14, 1952

2,614,098

UNITED STATES PATENT OFFICE 2,614,098

EMULSION POLYMERIZATION OF A CONJUGATED DIENE WITH A HEAVY HYDROPEROXIDE AND A HYPOSULFITE

Carl A. Uraneck, Borger, and Spencer H. Landes, Phillips, Tex., assignors to Phillips Petroleum Company, a corporation of Delaware No Drawing. Application November 25, 1949, Serial No. 129,518

8 Claims. (Cl. 260—84.3)

This invention relates to polymerization of a conjugated diene while dispersed in an aqueous medium. In one embodiment this invention relates to the production of synthetic rubber which is free from contamination by compounds of so-called heavy metals.

Synthetic elastomers prepared by low temperature polymerization methods are generally recognized as being superior in many of their physical properties to polymers prepared at higher temperatures. Numerous recipes have been developed in order to carry out low temperature polymerizations at conversion rates which are practical for plant operation. Recipes containing an organic reducing agent either in admixture with or in combination with a heavy metal salt have been regarded as very satisfactory when considered from the viewpoint of rate of polymerization. Iron salts such as ferrous sulfate and ferric nitrate are widely used; other heavy metal salts are also applicable provided that the metal is capable of changing its valence state reversibly. Since these heavy metal salts are at least partially responsible for promoting the polymerization reaction, they must generally be used in appreciable amounts in order that polymerization will proceed at the desired rate. While their presence in the emulsion may be advantageous as far as their promoting effect is concerned, these heavy metals become incorporated in the resulting coagulated polymer and it is believed that they have certain deleterious effects on the properties of the polymer, such as aging characteristics and flex life.

We have now discovered a method whereby low temperature polymerization reactions may be carried out in such a manner that polymers free from heavy metals are obtained. The method comprises the use of hyposulfites as activators together with organic hydroperoxides of high molecular weight, which together serve as catalysts for the reaction.

An object of this invention is to polymerize unsaturated organic compounds.

Another object of this invention is to produce synthetic rubber.

A further object of this invention is to produce polymers of high molecular weight which are free from small amounts of heavy metals.

Further objects and advantages of this invention will become apparent, to one skilled in the art, from the accompanying disclosure and discussion.

In so-called redox polymerization systems, heavy metal salts are frequently employed in the polymerization recipe, particularly for low temperature reactions. In recipes of this type, the activator comprises the heavy metal salt, for example, ferrous sulfate, a pyrophosphate, and, in many instances, a polyhydroxy compound such as a sugar. In other recipes the sugar or other organic reducing agent is omitted. In any case, the ferrous sulfate and pyrophosphate react to form a complex compound. An oxidant, for example, a peroxidic material, is present in the polymerization system in addition to these activator ingredients.

The process of the present invention is offered in contrast to the above described method. One important difference is that the system is much simpler. No heavy metal salt is necessary, the activator comprising instead an aqueous solution of an alkali metal hyposulfite. The oxidant, which is also an essential ingredient in the polymerization system, is an organic hydroperoxide having from six to thirty, inclusive, carbon atoms per molecule. While the invention is not dependent upon any particular reaction mechanism, the initiating and/or promoting effect is regarded as being accomplished by the oxidation of one compound by another in the system, with the simultaneous generation of free radicals which, in turn, effect monomer reaction.

The hyposulfites employed as activators are those of the alkali metals, and particularly sodium and potassium hyposulfites. An aqueous solution of the desired hyposulfite is usually prepared first and this solution then charged to the polymerization system. The concentration of the activator solution is usually in the range from a 0.2 to a 10 per cent solution.

The organic hydroperoxides, or hydroperoxymethanes, which can be used in the practice of this invention are those which contain at least six carbon atoms per molecule and not more than thirty carbon atoms per molecule. They can be represented by the formula RR'R''COOH wherein R is selected from the group consisting of hydrogen and organic radicals, and each of R' and R'' is an organic radical, or R'R'' together comprise a tetramethylene or pentamethylene group forming with the

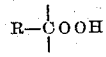

a cyclopentyl- or cyclohexylhydroperoxide. Each of R, R' and R'' can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e. mercapto compounds and thioethers), and halogen compounds. Examples of such hydroperoxides include diisopropyl hydroperoxide (isopropyl (dimethyl) hydroperoxymethane), cumene hydroperoxide (phenyl (dimethyl) hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl (isopropylphenyl) hydroperoxymethane), methylethyl (ethoxyphenyl) hydroperoxymethane, methyldecyl (methylphenyl) hydroperoxymethane, dimethyldecylhydroperoxymethane, methylchlorophenylphenylhydroperoxymethane, and tertiary-butylisopropylbenzene hydroperoxide (dimethyl (tertiary-butylphenyl) hydroperoxymethane). Such hydroperoxides can be easily prepared by simple oxidation, with free oxygen, of the corresponding hydrocarbon or hydrocarbon derivative, i. e. of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. This hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopropylphenyl) hydroperoxymethane.

One large group of these hydroperoxymethanes is that group in which each of the three substituent groups is a hydrocarbon radical. One of the sub-groups of these compounds is the alkaryl-dialkyl hydroperoxymethanes, in which the two alkyl groups are relatively short, i. e. have from one to three or four carbon atoms each, including dimethyl (tertiarybutylphenyl) hydroperoxymethane, dimethyl (diisopropylphenyl) hydroperoxymethane, dimethyl (isopropylphenyl) hydroperoxymethane, dimethyl (dodecylphenyl) hydroperoxymethane, dimethyl (methylphenyl) hydroperoxymethane, and corresponding methylethyl and diethyl compounds, and the like. Another subgroup includes at least one long alkyl group directly attached to the hydroperoxymethane, such as methyldecyl (methylphenyl) hydroperoxymethane, ethyldecylphenylhydroperoxymethane, and the like. Still another subgroup includes trialkyl compounds, such as dimethyldecylhydroperoxymethane, and the like; aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. These materials preferably will have a total of not more than thirty carbon atoms per molecule. A further subgroup comprises cyclopentyl and cyclohexyl hydroperoxides, such as result from oxidation of cyclohexane, methylcyclopentane, phenylcyclohexane, 1,2,3,4,4$a$,9,10,10$a$-octahydrophenanthrene, etc.

The amounts of the hyposulfite and the organic hydroperoxide employed may be expressed in terms of the monomers and also in relationship to each other. It is convenient to express these quantities in terms of 100 parts of monomers, and the amounts which are usually used to obtain optimum results are preferably organic hydroperoxide, 0.5 to 5 millimols; alkali metal hyposulfite, 0.5 to 5 millimols. In general the amount of hyposulfite used per millimol of peroxidic material will vary in the range from 0.25 to 2.5 millimols. In any instance the same units of weight should be used throughout, i. e. when the monomeric material is measured in pounds these other ingredients should be measured in pounds, pound mols, millipound mols, and the like.

The present invention is directed primarily to the production of polymers, of conjugated dienes, which have physical properties classifying them as synthetic rubber, and the invention is particularly applicable to the polymerization of hydrocarbon monomeric materials. Such materials include 1,3-butadiene and other conjugated diolefin hydrocarbons having not more than six carbon atoms per molecule, halogen derivatives, such as chloroprene, fluoroprene, and the like. either alone, in admixture with each other, or together with minor amounts of other unsaturated monomeric materials which are copolymerizable therewith in aqueous emulsion, such as styrene, alpha methylstyrene, vinyltoluene, chlorostyrene, etc. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols of higher boiling point than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

Emulsifying agents which are applicable in these low temperature polymerizations are materials such as potassium laurate, potassium oleate, and the like, and salts of rosin acids. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH may be within the range of 9.0 to 12, with the narrower range of 9.5 to 10.5 being most generally preferred.

In preparing synthetic rubber by polymerizing conjugated dienes, by the process of this invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

When operating according to the method of this invention, the polymerization temperature is usually within the range of −40 to about 10° C., with a polymerization temperature between −20 and 5° C. usually preferred.

Advantages of this invention are illustrated by the following examples. The reactants, and their proportions, and the other specific ingredients of the recipes are presented as being typical and should not be construed to limit the invention unduly.

EXAMPLE I

In a series of butadiene-styrene polymerizations at 5° C., two hydroperoxides were employed as oxidants with sodium hyposulfite as the reductant. Three emulsifiers were used. The basic recipe was as follows:

| | Parts by weight |
|---|---|
| Butadiene | 70 |
| Styrene | 30 |
| Water (total) | 180 |
| Emulsifier | 5.0 |
| Mercaptan blend [1] | 0.25 |
| Hyproperoxide | Variable (2.25 millimols) |
| Sodium hyposulfite, $Na_2S_2O_4.2H_2O$ | 0.42 (2.0 millimols) |

[1] A blend of tertiary $C_{12}$, $C_{14}$, and $C_{16}$ aliphatic mercaptans in a ratio of 3:1:1 parts by weight.

The sodium hyposulfite activator in each case was made up in 20 parts water. The emulsifier solution was charged to the reactor followed by the hyposulfite solution and the mercaptan dissolved in styrene. The temperature was adjusted to 5° C., after which the butadiene was introduced and then the hydroperoxide. Polymerization was then effected according to the conventional technique. The results are tabulated below.

| Emulsifier | Hydroperoxide | Conversion, percent | | |
|---|---|---|---|---|
| | | 10.5 Hrs. | 18 Hrs. | 34.5 Hrs. |
| K laurate | Cumene | 34 | 46 | 59 |
| Do | Diisopropylbenzene | 28 | 43 | 71 |
| K rosin soap [1] | Cumene | 22 | 32 | 54 |
| Do | Diisopropylbenzene | 8 | 16 | 31 |
| K soap, hydrogenated tallow acid [2] | Cumene | 32 | 41 | 47 |
| Do | Diisopropylbenzene | 26 | 43 | 62 |

[1] Dresinate-214.
[2] K-SF flakes, a soap having the following specifications:
Iodine No. _____ 52 maximum.
Iodine No. minus thiocyanogen No. _____ Not to exceed 6.
Saturated acid below $C_{12}$ _____ 1.0% maximum.
Unsaturated acid above $C_{18}$ _____ 2.0% maximum.
Saturated acid above $C_{18}$ _____ 5.0% maximum.

EXAMPLE II

Cumene hydroperoxide was employed as the oxidant and sodium hyposulfite as the reductant in the following polymerization recipe in which the fatty acid emulsifiers used were the same as those in Example I.

| | Parts by weight |
|---|---|
| Butadiene | 70 |
| Styrene | 30 |
| Water | 170 |
| Methanol | 40 |
| Emulsifier | 5.0 |
| Mercaptan blend [1] | 0.25 |
| Cumene hydroperoxide, 100% | 0.34 (2.25 millimols) |
| Sodium hyposulfite, $Na_2S_2O_4 \cdot 2H_2O$ | 0.42 (2.0 millimols) |

[1] See Example I.

The charging procedure employed was the same as that given in Example I. The temperature was regulated at −10° C. The following results were obtained:

| Emulsifier | Conversion, percent | | |
|---|---|---|---|
| | 10.5 Hours | 18 Hours | 34.5 Hours |
| K laurate | 7 | 10 | 31 |
| K soap, hydrogenated tallow acid | 10 | 12 | 22 |

EXAMPLE III

The recipe of Example II was used to carry out a series of polymerizations at −10° C. in the presence of variable amounts of sodium hyposulfite as the reductant. The emulsifier present in this system was potassium laurate (ph 9.0). Results of this series of runs are herewith presented:

| $Na_2S_2O_4 \cdot 2H_2O$ | | Conversion, percent | | |
|---|---|---|---|---|
| Millimols | Parts | 16 Hours | 24 Hours | 24.5 Hours |
| 0.5 | 0.105 | 2 | 3 | |
| 1.0 | 0.21 | 9 | 9 | 21 |
| 1.5 | 0.32 | 10 | 5 | 28 |
| 2.0 | 0.42 | 15 | 22 | 29 |

EXAMPLE IV

In order to illustrate the contrast in action between sodium hyposulfite and other inorganic compounds which frequently have reducing properties in aqueous solution, as reductants in a heavy metal-free polymerization system, a series of runs was made using the recipe of Example II except for the quantities of cumene hydroperoxide and the reductant. These materials were used at the 2.0 millimol level. Polymerization was carried out at −10° C. The following results were obtained.

| Reducing Agent | Time, Hours | Conversion, percent |
|---|---|---|
| $Na_2SO_3$ | 29 | 0 |
| $K_4Fe(CN)_6$ | 24.3 | 0.5 |
| $Na_2S$ | 24.3 | 0 |
| $NaH_2PO_2 \cdot H_2O$ | 16.5 | 0 |
| $Na_2S_2O_4 \cdot 2H_2O$ | 16.5 | 17 |
| $NaAsO_2$ | 16.5 | 0 |
| $Na_2S_2O_3$ | 16.5 | 0 |

EXAMPLE V

Several inorganic and organic oxidants were tried as catalysts in the 5° C. polymerization recipe of Example I activated with sodium hyposulfite. The operability of the organic hydroperoxides is illustrated by the following data.

| Oxidant | Conversion, percent | |
|---|---|---|
| | 9.0 Hours | 21 Hours |
| $NaClO_3$ | 0 | 0 |
| $KBrO_3$ | 0 | 0 |
| $KIO_3$ | 0 | 0 |
| $KIO_4$ | 0 | 0 |
| $KClO_4$ | 0 | 0 |
| $KOCl$ | 1 | 2.1 |
| $KMnO_4$ | 0 | 0 |
| $K_2S_2O_8$ | 0.5 | 0.2 |
| $K_2S_2O_5$ | 0 | 0 |
| $NaBO_3 \cdot 4H_2O$ | 0 | 0 |
| $Na_4P_2O_7 \cdot H_2O_2$ | 0 | 0 |
| $Na_2CO_3 \cdot H_2O_2$ | 0 | 0 |
| $K_3Fe(CN)_6$ | 0 | 0 |
| Tertiary butyl hydroperoxide | 1 | 3 |
| Cumene hydroperoxide | 29 | 51 |
| Tetralin hydroperoxide | 18 | 28 |
| Triisopropylbenzene hydroperoxide | 22 | 55 |
| Diisopropylbenzene hydroperoxide | 25 | 58 |

EXAMPLE VI

A series of polymerization runs was made at 5° C. using different hydroperoxides in the following recipe:

| | Parts by weight |
|---|---|
| Butadiene | 70 |
| Styrene | 30 |
| Water | 180 |
| Potassium rosin soap [1] | 5 |
| Trisodium phosphate, $Na_3PO_4 \cdot 12H_2O$ | 0.3 |
| Mercaptan blend [2] | 0.25 |
| Hydroperoxide | Variable (1.25 millimols) |
| Sodium hyposulfite, $Na_2S_2O_4 \cdot 2H_2O$ | 0.21 (1.0 millimol) |

[1] Dresinate 214 with solution having a pH of 11.4.
[2] A blend of tertiary $C_{12}$, $C_{14}$, and $C_{16}$ aliphatic mercaptans in a ratio of 3:1:1 parts by weight.

The charging procedure was that given in Example I. The results obtained with the various hydroperoxides are tabulated below.

| Hydroperoxide from oxidation of— | Conversion, Percent | | |
|---|---|---|---|
| | 11 Hours | 19 Hours | 40.3 Hours |
| Isopropylbenzene | 22 | 26 | 36 |
| Phenylcyclohexane | 17 | 24 | 31 |
| Tert-butylisopropylbenzene | 12 | 18 | 28 |
| 1,2,3,4,4a,9,10,10a-Octahydrophenanthrene | 15 | 27 | 42 |
| Diisopropylchlorobenzene | 12 | 13 | 33 |
| Methyldodecylbenzene | 7 | 9 | 21 |
| Methoxyisopropylbenzene | 21 | 27 | 38 |
| Isopropylchlorobenzene | 20 | 24 | 33 |
| Triisopropylbenzene | 14 | 20 | 24 |
| Diisopropylbenzene | 16 | 23 | 43 |

EXAMPLE VII

Two hydroperoxides containing an alpha-hydroxy group were prepared by the interaction of hydrogen peroxide with corresponding aldehydes. Reactions were conducted in alcohol solution at room temperature. In either case, as the reaction proceeded the product precipitated and was filtered and was subsequently analyzed.

The hydroperoxides, prepared as described above, were used as oxidants in the polymerization recipe given in Example I. The following results were obtained:

| Hydroperoxide | Hydroperoxide Assay | Conversion, Percent | | |
|---|---|---|---|---|
| | | 9.5 Hours | 16.5 Hours | 32.5 Hours |
| α-Hydroxy-o-chlorobenzyl | 48 | 7 | 14 | 20 |
| α-Hydroxyheptyl | 88 | 10 | 12 | 16 |

As will be evident to those skilled in the art, various modifications of this invention can be made, or followed, in the light of the foregoing disclosure and discussion, without departing from the spirit or scope of the disclosure or from the scope of the claims.

We claim:

1. In the production of synthetic rubber by polymerization of a monomeric material comprising a major portion of 1,3-butadiene and a minor portion of styrene while dispersed in an aqueous medium, the improvement which comprises polymerizing said monomeric material in the presence of a catalyst composition consisting of 0.5 to 5 millimols each of diisopropylbenzene hydroperoxide and of sodium hyposulfite, per 100 parts by weight of said monomeric material, with a molecular ratio of said hydroperoxide to said hyposulfite between 1:0.25 and 1:2.5, at a polymerization temperature between 10 and −40° C.

2. In the production of synthetic rubber by polymerization of a monomeric material comprising a major portion of 1,3-butadiene and a minor portion of styrene while dispersed in an aqueous medium, the improvement which comprises polymerizing said monomeric material in the presence of a catalyst composition consisting of 0.5 to 5 millimols each of phenyl(dimethyl)hydroperoxymethane and of sodium hyposulfite, per 100 parts by weight of said monomeric material, with a molecular ratio of said hydroperoxide to said hyposulfite between 1:0.25 and 1:2.5, at a polymerization temperature between 10 and −40° C.

3. In the production of synthetic rubber by polymerization of a monomeric material comprising a major portion of 1,3-butadiene and a minor portion of styrene while dispersed in an aqueous medium, the improvement which comprises polymerizing said monomeric material in the presence of a catalyst composition consisting of 0.5 to 5 millimols each of triisopropylbenzene hydroperoxide and of sodium hyposulfite, per 100 parts by weight of said monomeric material, with a molecular ratio of said hydroperoxide to said hyposulfite between 1:0.25 and 1:2.5, at a polymerization temperature between 10 and −40° C.

4. In the production of synthetic rubber by polymerization of a monomeric material comprising a major portion of 1,3-butadiene and a minor portion of styrene while dispersed in an aqueous medium, the improvement which comprises polymerizing said monomeric material in the presence of a catalyst composition comprising essentially 0.5 to 5 millimols each of an organic hydroperoxide having from six to thirty, inclusive, carbon atoms per molecule and of an alkali metal hyposulfite, per 100 parts by weight of said monomeric material, with a molecular ratio of said hydroperoxide to said hyposulfite between 1:0.25 and 1:2.5.

5. A process for producing a synthetic rubber, which comprises polymerizing a monomeric material comprising a major amount of a conjugated diene having not more than six carbon atoms per molecule while dispersed in an aqueous medium in the presence of a catalyst composition comprising essentially an organic hydroperoxide having from six to thirty, inclusive, carbon atoms per molecule and a water-soluble hyposulfite.

6. A polymerization process which comprises polymerizing a monomeric material comprising a major amount of a conjugated diene having not more than six carbon atoms per molecule while dispersed in an aqueous medium in the presence of a catalyst composition comprising essentially 0.5 to 5 millimols each of an organic hydroperoxide having from six to thirty, inclusive, carbon atoms per molecule and of an alkali metal hyposulfite, per 100 parts by weight of said monomeric material, with a molecular ratio of said hydroperoxide to said hyposulfite between 1:0.25 and 1:2.5.

7. The process of claim 6 in which said monomeric material comprises 1,3-butadiene.

8. The process of claim 6 in which said organic hydroperoxide is diisopropylbenzene hydroperoxide.

CARL A. URANECK.
SPENCER H. LANDES.

REFERENCES CITED

The following references are of record in the file of this patent:

UNITED STATES PATENTS

| Number | Name | Date |
|---|---|---|
| 2,383,055 | Fryling | Aug. 21, 1945 |
| 2,462,354 | Brubaker et al. | Feb. 22, 1949 |

OTHER REFERENCES

Troyan: Rubber Age, vol. 63, No. 5, August 1948, pages 585–595.